(12) United States Patent
Boland et al.

(10) Patent No.: US 9,104,478 B2
(45) Date of Patent: Aug. 11, 2015

(54) SYSTEM AND METHOD FOR IMPROVED JOB PROCESSING OF A NUMBER OF JOBS BELONGING TO COMMUNICATION STREAMS WITHIN A DATA PROCESSOR

(75) Inventors: Timothy G. Boland, Phoenix, AZ (US); Anne C. Harris, Chandler, AZ (US); Steven D. Millman, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 280 days.

(21) Appl. No.: 13/524,947

(22) Filed: Jun. 15, 2012

(65) Prior Publication Data

US 2013/0339968 A1    Dec. 19, 2013

(51) Int. Cl.
*G06F 9/46* (2006.01)
*G06F 9/48* (2006.01)
*H04L 12/873* (2013.01)

(52) U.S. Cl.
CPC ............ *G06F 9/4881* (2013.01); *H04L 47/522* (2013.01)

(58) Field of Classification Search
None
See application file for complete search history.

(56) References Cited

U.S. PATENT DOCUMENTS

| | | | |
|---|---|---|---|
| 5,414,845 A | 5/1995 | Behm et al. | |
| 5,564,062 A | 10/1996 | Meaney et al. | |
| 5,826,081 A | 10/1998 | Zolnowsky et al. | |
| 5,835,765 A | 11/1998 | Matsumoto | |
| 5,978,830 A | 11/1999 | Nakaya et al. | |
| 5,999,965 A | 12/1999 | Kelly | |
| 6,374,286 B1 * | 4/2002 | Gee et al. | 718/108 |
| 6,587,466 B1 * | 7/2003 | Bhattacharya et al. | 370/395.21 |
| 6,721,309 B1 | 4/2004 | Stone et al. | |
| 6,769,125 B2 | 7/2004 | Menges et al. | |
| 6,938,252 B2 | 8/2005 | Baylor et al. | |
| 6,975,629 B2 * | 12/2005 | Welin | 370/392 |
| 7,042,887 B2 * | 5/2006 | Sampath et al. | 370/401 |
| 7,073,174 B2 | 7/2006 | Volkoff et al. | |
| 7,149,230 B2 | 12/2006 | Coffin, III et al. | |
| 7,280,548 B2 * | 10/2007 | Sampath et al. | 370/401 |
| 7,316,017 B1 | 1/2008 | Jacobson et al. | |
| 7,349,398 B1 | 3/2008 | Favor et al. | |

(Continued)

FOREIGN PATENT DOCUMENTS

EP    1326400 B1    9/2007

OTHER PUBLICATIONS

U.S. Appl. No. 13/524,947, filed Jun. 15, 2012, entitled "System and Method for Improved Job Processing to Reduce Contention for Shared Resources".

(Continued)

*Primary Examiner* — Van Nguyen
(74) *Attorney, Agent, or Firm* — Quarles & Brady LLP

(57) ABSTRACT

A method of processing a job is presented. A packet selector determines a candidate job list including an ordered listing of candidate jobs. Each candidate job in the ordered listing belongs to a communication stream. Jobs in the candidate job list that are eligible for execution are identified by determining whether a preceding job belonging to the same communication stream as the candidate job is present in the candidate job list, and, for each candidate job in the candidate job list, determining whether a preceding job belonging to the same communication stream as the candidate job is being prepared for execution. The packet selector determines a priority for each eligible candidate job in the candidate job list by at least comparing the communication stream of each candidate job to a communication stream of a first job executing within the data processor.

9 Claims, 7 Drawing Sheets

(56) References Cited

U.S. PATENT DOCUMENTS

| | | | |
|---|---|---|---|
| 7,380,038 B2 | 5/2008 | Gray | |
| 7,451,183 B2 * | 11/2008 | Romero et al. | 709/206 |
| 7,500,098 B2 | 3/2009 | Paatero | |
| 7,512,728 B2 * | 3/2009 | Tseng | 710/100 |
| 7,644,408 B2 | 1/2010 | Kroening | |
| 7,649,901 B2 | 1/2010 | Musoll et al. | |
| 7,810,094 B1 | 10/2010 | McClure et al. | |
| 7,836,448 B1 | 11/2010 | Farizon et al. | |
| 7,895,431 B2 | 2/2011 | Bouchard et al. | |
| 8,316,368 B2 * | 11/2012 | Vestal et al. | 718/102 |
| 8,503,323 B2 * | 8/2013 | Welin | 370/252 |
| 2002/0116248 A1 | 8/2002 | Amit et al. | |
| 2003/0189573 A1 | 10/2003 | Dahlen et al. | |
| 2003/0217224 A1 | 11/2003 | Watts | |
| 2003/0223442 A1 | 12/2003 | Huang et al. | |
| 2004/0024915 A1 | 2/2004 | Abe | |
| 2004/0160445 A1 | 8/2004 | Gosalia et al. | |
| 2004/0160446 A1 | 8/2004 | Gosalia et al. | |
| 2005/0033889 A1 | 2/2005 | Haas et al. | |
| 2005/0141503 A1 | 6/2005 | Welfeld | |
| 2010/0103938 A1 | 4/2010 | Musoll et al. | |
| 2010/0293353 A1 | 11/2010 | Sonnier et al. | |
| 2010/0318996 A1 | 12/2010 | Harris et al. | |

OTHER PUBLICATIONS

U.S. Appl. No. 13/524,918, filed Jun. 15, 2012, entitled "System and Method for Improved Job Processing".

Jones et al., "The Impact of Information Availability and Workload Characteristics on the Performance of Job Co-3 Allocation in Multi-Clusters," 2006 IEEE 2006 IEEE International Conference on Parallel and Distributed Systems, D Jan. 2006, pp. 1-10.

Wei et al., "Contract Net Based Scheduling Approach Using Interactive Bidding for Dynamic Job Shop Scheduling," 2007, IEEE International Conference on Integration Technology, Mar. 20-24, 2007, pp. 1-6.

Non-Final Office Action mailed Oct. 27, 2011 for U.S. Appl. No. 12/483,501, 21 pages.

Final Office Action mailed Jun. 8, 2012 for U.S. Appl. No. 12/483,501, 15 pages.

Notice of Allowance mailed Dec. 26, 2012 for U.S. Appl. No. 12/483,501, 17 pages.

Non-Final Office Action mailed Nov. 20, 2014 for U.S. Appl. No. 13/524,918, 16 pages.

Non-Final Office Action mailed Feb. 27, 2015 for U.S. Appl. No. 13/801,576, 9 pages.

* cited by examiner

SYSTEM AND METHOD FOR IMPROVED JOB PROCESSING OF A NUMBER OF JOBS BELONGING TO COMMUNICATION STREAMS WITHIN A DATA PROCESSOR

FIELD OF USE

The present disclosure relates generally to electronic processing systems, and more specifically, to systems and methods for improving job processing efficiency.

BACKGROUND

In many data processing applications, including those used in networking and communication applications, input data is provided to the processing system in a number of packet streams or flows. Packets that belong to the same stream are typically processed using the same ancillary data, sometimes referred to as commands and context. The commands and context can include state information, operands, and other data used in processing the packets of a particular stream. Example ancillary data can include security keys or tokens (e.g., for use in processing streams associated with encrypting and/or decrypting data), initialization vectors, protocol information, and other metadata used to process a stream of data packets. Often, the data processing operations are offloaded from the main processing architecture to specialized hardware configured to perform the various data processing operations.

Systems that handle a large number of data streams usually attempt to store the ancillary data for a number of streams in low-latency local storage devices in order to shorten processing time. However, because the systems only have a limited memory capacity, the systems are often required to repeatedly swap out ancillary data from local storage devices to slower, external storage devices. As a result, while processing a number of different streams or flows, the systems are often required to reload the ancillary data from these other, slower, storage devices. This adds a significant amount of time to packet processing and increases congestion on internal and external memory busses.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
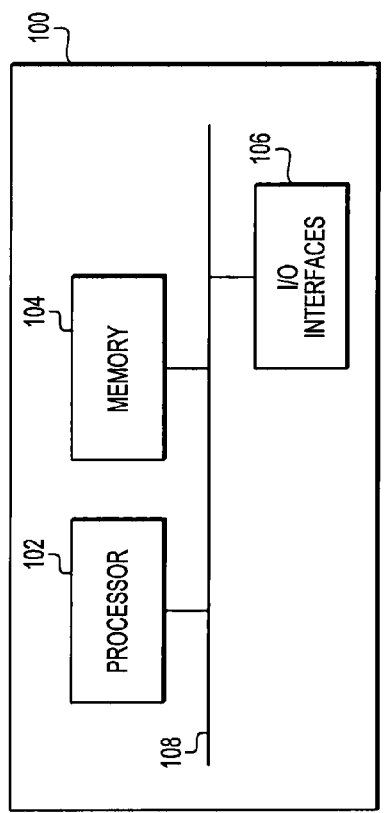
FIG. 1 is a block diagram showing functional components of an embodiment of a data processing system.

The present disclosure provides a method of processing a job with a data processor. The method includes determining, by a packet selector, a candidate job list including an ordered listing of candidate jobs. Each candidate job in the ordered listing belongs to a communication stream. The method includes identifying jobs in the candidate job list that are eligible for execution by, for each candidate job in the candidate job list, determining whether a preceding job belonging to the same communication stream as the candidate job is present in the candidate job list, and, for each candidate job in the candidate job list, determining whether a preceding job belonging to the same communication stream as the candidate job is being prepared for execution. The method includes determining, by the packet selector, a priority for each eligible candidate job in the candidate job list by at least comparing the communication stream of each candidate job to a communication stream of a first job executing within the data processor, selecting, by the packet selector, selecting an oldest job of the ordered listing of candidate jobs having a highest priority for transfer to execution, and executing, by a processing unit, the selected job.

The present disclosure also provides a method of processing a job with a data processor. The method includes determining, by a packet selector, a candidate job list including an ordered listing of candidate jobs, each candidate job in the ordered listing belongs to a communication stream. The method includes determining, by the packet selector, a priority for each job in the candidate job list by at least comparing the communication stream of each candidate job to a communication stream of a first job executing within the data processor.

The present disclosure also provides a data processor including a packet selector configured to determine a candidate job list including an ordered listing of candidate jobs, each candidate job in the ordered listing belonging to a communication stream, and determine a priority for each job in the candidate job list by at least comparing the communication stream of each candidate job to a communication stream of a first job executing within the data processor.

The present disclosure also provides a method of processing a job with a data processor. The method includes determining, by a packet selector, a candidate job list including an ordered listing of candidate jobs. Each candidate job in the ordered listing belongs to a communication stream. The method includes identifying one or more shared resources required for execution of a first job in the candidate job list. The method includes determining whether the first job is eligible for execution by determining an availability of the one or more shared resources required for the first job, when the one or more shared resource required for the first job are unavailable and no jobs executing within the data processor are from the same communication stream as the first job, determining that the first job is not eligible for execution, and, when the one or more shared resource required for the first job are available or one or more jobs executing within the data processor are from the same communication stream as the first job, determining that the first job is eligible for execution.

The present disclosure also provides a method of processing a job with a data processor. The method includes identifying a job belonging to a communication stream and requiring a shared resource for execution, and determining an availability of the one or more shared resources required for the job. The method includes, when the one or more shared resource required for the job are unavailable and no jobs executing within the data processor are from the same communication stream as the job, reducing a priority for execution of the job.

The present disclosure also provides a data processor including a packet selector configured to determine a candidate job list including an ordered listing of candidate jobs, each candidate job in the ordered listing belonging to a communication stream, identify one or more shared resources required by a first job in the candidate job list, and determine an availability of the one or more shared resources required by the first job. The packet selector is configured to, when the one or more shared resource required by the first job are unavailable and no job executing within the data processor is from the same communication stream as the first job, reduce a priority for execution of the job. The data processor includes a processor configured to execute the first job.

The following detailed description is merely illustrative in nature and is not intended to limit the present disclosure, or the application and uses of the present disclosure. Furthermore, there is no intention to be bound by any expressed or implied theory presented in the preceding technical field, background, or the following detailed description. The present disclosure provides various examples, embodiments and the like, which may be described herein in terms of functional or logical block elements. It should be recognized that such block elements may be realized by any number of hardware elements configured to perform the specified function. For example, one embodiment of the present disclosure may employ various integrated circuit elements such as memory elements, clock elements, logic elements, analog elements, or the like, which may carry out a variety of functions under the control of a microprocessor or another processing device. Further, it should be understood that all elements described herein may be implemented including in silicon or another semiconductor material, another implementation alternative, or any combination thereof.

The following description refers to a number of block elements or nodes or features being "connected" or "coupled" together. As used herein, unless expressly stated otherwise, "connected" means that one element/node/feature is joined to (or communicates with) another element/node/feature, and not necessarily mechanically. Unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

In this disclosure, conventional techniques related to computer architecture, hardware acceleration, data processing, data formatting, memory operations, instruction set programming and/or other low-level programming, cryptography, authentication, and other functional aspects of the system (and the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to embodiments of systems and methods for ordering job processing within a data processing system. In some embodiments of the present system, job processing time is reduced by providing for increased reuse of readily-accessible context data. This reduces the frequency with which context data must be retrieved from external storage systems and minimizes bottlenecks and congestion on internal and external memory busses. In some embodiments, the present system also provides for processing jobs in an order that improves the likelihood that certain shared resources used in performing the jobs will be available. As such, bottlenecks created by multiple jobs vying for the same shared resources are reduced.

FIG. 1 is a block diagram showing functional components of an embodiment of a data processing system 100. System 100 may be used to provide the functionality of a networking device, such as, for example, a router, switch, bridge, server, or another suitable network infrastructure component. In one implementation, system 100 includes, without limitation, processing system 102, memory 104 and input/output interfaces 106. The components of system 100 are interconnected by communication bus 108.

System 100 may be implemented in a single integrated circuit as a system-on-a-chip (SOC). In this regard, the processing system 102, memory 104, input/output interfaces 106, and other components, such as a data protection architecture and/or datapath acceleration architecture (DPAA) may be integrally formed into a single integrated circuit, as will be appreciated in the art. It should be understood that FIG. 1 is a simplified representation of a data processing system 100 for purposes of representation and ease of explanation and is not intended to limit the subject matter described herein in any way. In this regard, in alternative embodiments, the processing system 102, memory 104, and input/output interfaces 106 may each be realized as separate integrated circuits. It will be appreciated that practical embodiments of the data processing system 100 may include additional components and/or elements configured to perform additional functionality not described herein.

Processing system 102 generally represents the main processing core(s) or central processing unit(s) (CPU) for system 100. In this regard, the processing system 102 executes applications and/or programs for the data processing system 100, accesses (e.g., reads from and/or writes to) memory 104, and interacts with other elements of the data processing system 100 in a conventional manner, as will be appreciated in the art. In an exemplary embodiment, the processing system 102 is implemented or realized as a plurality of microprocessor cores, however, in alternative embodiments, the processing system 102 may be realized with a general purpose processor, a microprocessor, a microcontroller, a content addressable memory, a digital signal processor (DSP), an application-specific integrated circuit (ASIC), a field programmable gate array (FPGA), any suitable programmable logic device, discrete gate or transistor logic, discrete hardware components, or any combination thereof, designed to support and/or perform the functions described herein.

Memory 104 is configured to support operations of the processing system 102 as well as other components of the system 100 as will be appreciated in the art. In this regard, memory 104 functions as the main memory or primary memory for data processing system 100. Depending on the implementation, memory 104 may be realized as RAM memory, ROM memory, flash memory, registers, hard disk, or another suitable storage medium known in the art or any suitable combination thereof.

Input/output interfaces 106 represents the hardware, software, and/or firmware components of system 100 configured to support communications (e.g., input from and output to) between system 100 and one or more peripheral (or external) devices. In an exemplary embodiment, the input/output interfaces 106 are in communication with or include at least one communications interface (e.g., an Ethernet interface) configured to support data transmission to/from system 100 and other devices over a network (e.g., a local area network, a wireless network, or the like) in accordance with one or more data communication protocols, such as, for example, conventional Internet Protocol techniques, TCP/IP, hypertext transfer protocol (HTTP), IEEE 802.11 (any variation), IEEE 802.16 (WiMAX or any other variation), or another comparable protocol. In addition, input/output interfaces 106 may include other peripheral interfaces, such as, for example, Peripheral Component Interconnect (PCI) interfaces, RapidIO interfaces, Universal Serial Bus (USB) interfaces, and the like.

System 100 may include a number of components to facilitate packet processing. For example, system 100 may include a data processor such as a security processor or security block to perform encryption and encryption actions on incoming data packets. A security processor, for example, may include a DPAA (executed by processing system 102 or a separate component) to support hardware acceleration for various networking-related functions. The security processor may also include a data protection architecture to support various functions to facilitate cryptographic operations.

The security processor may be implemented as a software module executed by processor 102, or may be implemented as a processing unit that is separate from processor 102, but in communication with processor 102 (e.g., via bus 108). The security processor is configured to receive input data and perform encryption and decryption of that data. Depending upon the contents of a particular input data packet, the security processor retrieves ancillary data (e.g., commands and context) used in processing the data packet and executes the appropriate commands on the incoming data packet. The security processor generally receives input data from a queue manager provided by processor 102 of data processing system 100. The security processor may support data processing functions for one or more security protocols, such as, for example, internet protocol security (IPsec), transport layer security (TLS) and/or secure sockets layer (SSL), secure real-time transport protocol (SRTP), the IEEE 802.1AE MAC security standard (MACsec), the IEEE 802.16e WiMax MAC layer, third generation radio link control (3GPP RLC), or another suitable protocol.

Figure 2:
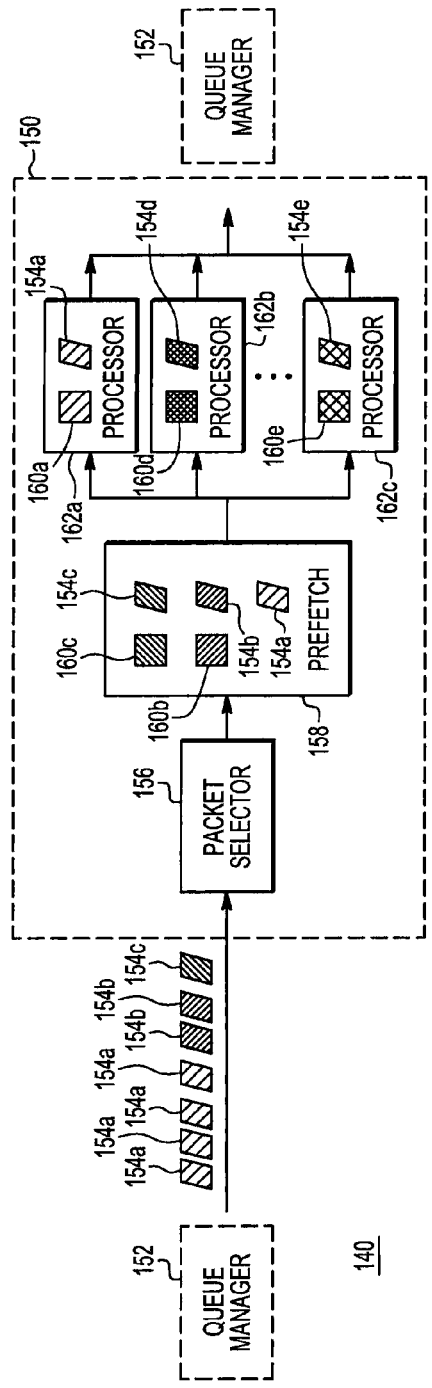
FIG. 2 is a block diagram showing the functional blocks of an embodiment of a data processor that may be implemented in conjunction with the processing system of FIG. 1.

FIG. 2 is a block diagram showing the functional blocks of an embodiment of a data processor 140 that may be implemented in system 100 of FIG. 1. In the present example, the data processor 140 includes security processor 150, though other types of data processors may be utilized in conjunction with embodiments of the present systems and methods for ordering job processing. Security processor 150 may be implemented as an independent processing device that is separate from processor 102 of system 100. Alternatively, security processor 150 may be implemented as a software module that is executed by processor 102. The security processor 150 shown in FIG. 2 receives task or job assignments from processor 102 of system 100 in the form of a number of input packets or frames, or references thereto. Each input packet or frame may belong to a particular communication stream or flow. Associated with each flow is a sequence of operations or tasks to be performed on the packets belonging to that flow.

The input packets are associated with data residing in memory 104 that includes various commands, metadata, payload data, and/or other information needed by the security processor 150 to perform and/or execute the one or more operations, tasks, processes and/or procedures that comprise the respective task. Security processor 150 receives input packets (or references thereto) for processing from processor 102 of system 100 (see FIG. 1) via queue manager 152.

Queue manager 152 maintains one or more queues that each contain multiple packets of data or packet streams that are to be processed by security processor 150. In order to retrieve data for processing, security processor 150 retrieves packets or packet references from queue manager 152 using a dequeue request. With each dequeue request, queue manager 152 delivers a number of packets 154 to security processor 150 for processing.

Each packet 154 is associated with a particular communication stream. For example, in FIG. 2, packets 154a belong b the same communication stream, while packets 154b and 154c each belong to their own communication stream. In general, packets belonging to the same communication stream are each processed using the same processing steps and therefore require the use of the same ancillary data. Accordingly, each input packet or reference to a packet is defined as a job to be executed on the packet data. For example, one communication stream may be undergoing decryption. In that case, each packet associated with that communication stream will be decrypted using the same commands and context (e.g., decryption keys, protocol information, and next packet sequence number). Different streams may call for the use of different encryption/decryption keys, and/or different sequences of processing steps, and the like.

To associate a particular packet 154 with a particular communication stream, queue manager 152 provides metadata to security processor 150 that describes a relationship between each packet 154 and a particular communication stream. In one implementation, the metadata includes a pointer to a memory location that stores instructions for processing the particular communication stream (referred to as a descriptor). As such, the metadata describes a job to be performed by the security processor on the input packet data.

After the dequeue command is transmitted to queue manager 152 and queue manager 152 transmits a number of dequeued packets or packet references 154 to security processor 150, the dequeued packets are received and stored by packet selector 156. Packet selector 156 is a functional module of security processor 150 configured to determine the order in which packets 154 received from queue manager 152 are to be processed. Packet selector 156 may store reference information for any appropriate number of packets.

When packet selector 156 determines that a particular incoming packet is to be processed, packet selector 156 transfers the packet (or reference data identifying the packet) to prefetch unit 158 to be prepared for execution or processing. Accordingly, prefetch unit 158, after receiving the packet from packet selector 156, retrieves the commands and context 160 associated with the processing of that packet and otherwise prepares an environment for the processor 150 to process the packet. The prefetch unit 158 may also retrieve the data that is to be processed in association with the packet 154. Prefetch unit 158 may be configured to only retrieve commands and context and related packet data for a single packet at a time, or may be configured to retrieve commands and context and related packet data for multiple packets in a parallel fashion.

After the prefetch unit 158 has retrieved both the commands and context as well as packet data for the incoming packet, the prefetch unit 158 transfers the packet and associated data to one of processors 162 of security processor 150 for processing or execution.

Security processor 150 may include one or more processors 162 configured to process data associated with the packets of one or more input communication streams. Processors 162 may include specialized controllers (one example controller-type includes descriptor controllers (DECOs)) configured to perform data protection jobs in conjunction with cryptographic hardware acceleration blocks. Processors 162 may include specialized cryptographic hardware accelerators (CHAs), such as, for example, an advanced encryption standard (AES) unit, a cyclic redundancy check (CRC) accelerator, a data encryption standard (DES) execution unit, a KASUMI execution unit, a SNOW hardware accelerator, a message digest execution unit, a public key execution unit, a random number generator (RNG), and the like.

Upon receiving both the packet data and associated commands and context, the security processor 150 processes the packet data using the associated commands and context. After the packet data is processed, security processor 150 outputs the processed data to queue manager 152 using an enqueue process (in FIG. 2, the same queue manager 152 is illustrated at both the input and output of processor 150). The processed data can then be used by system 100. As security processor 150 completes the processing of incoming packets 154, additional packets are dequeued from queue manager 152 to ensure that security processor 150 has a continual flow of incoming packets for processing.

During the operation of security processor 150, as the different incoming packets are processed, prefetch unit 158 fetches different commands and context for the data streams in which the different packets belong. If packets from different streams are processed after one another, prefetch unit 158 continuously retrieves new commands and context to allow the processing to take place. Sometimes the commands and context are retrieved from relatively slow storage devices, resulting in a decreased efficiency of the security processor. If, however, multiple packets from the same stream were to be processed sequentially, the commands and context can be reused, preventing the prefetch unit 158 from having to refetch those commands and context. In that case, security processor 150 operates more efficiently because the prefetch unit is not required to fetch new information and data to allow processing to take place.

Embodiments of the present systems and methods, therefore, can be configured to optimize the ordering of tasks or jobs within a security processor to provide that overall processing time is reduced. This is done by selecting packets for processing in a manner that enables jobs belonging to the same flow (i.e., relating to the same communication stream) to be processed sequentially, allowing for the reuse of commands and context already loaded from external memory.

Typically, systems handling a large number of communication flows or streams, such as communications systems, do not have the capacity to keep commands and context for all flows in internal storage. As a consequence, flow-specific common data must be reloaded over and over again. Because external memory access times can be a significant portion of the total processing time for a particular job or packet, average job processing time can be reduced by having the next job associated with a particular stream or flow ready to reuse the common data while the common data is still stored internally. Furthermore, in applications where part of the common data, such as, a packet sequence number, is updated between jobs, that data can be updated in internal storage instead of external memory if the next job in the flow is ready to start processing, providing further reduction in external memory access times for that flow.

Embodiments of the present ordering method can be implemented in the interface between a system queue manager 152 and the shared computing resources of a security processor 150, or other data processing unit. For example, the present method may be implemented by a packet selector, as illustrated by packet selector 156 of FIG. 2.

When implemented by a packet selector 156, the packet selector 156 issues dequeue requests to a system queue manager 152. The queue manager 152 responds with a list of packets, belonging to one or more streams, defining jobs to be performed by the security processor. The list of jobs includes references to packet data to be processed as well as ancillary data that may be used in processing the packet data. Using the job list, the packet selector 156 creates an ordered list of candidate jobs for the security processor 150.

After the ordered list of jobs is created, the packet selector 156 selects the next job to be prefetched (e.g., by prefetch unit 158). Once prefetched, the job can be transferred to the data processing units shared computing resources for processing. The shared resources may include multiple command execution units (e.g., processors, such as processors 162a, 162b, and 162c of FIG. 2), but in some implementations, only a single command execution unit is provided. Once a job is selected, a job queue (e.g., prefetch unit 158 of FIG. 2) buffers and prepares jobs to start execution.

To reuse commands and context that have already been loaded into an execution unit (and, thereby improve the processing efficiency of that execution unit), a job from the same flow as an executing job is transferred to that execution unit when execution finishes or reaches a point where sharing is allowed. Embodiments of the present ordering methods can anticipate this requirement when selecting jobs from the dequeue-ordered list for transfer to the job queue. Several criteria are evaluated to determine eligibility and relative priority for selection. Using the method, dequeue order is considered to ensure that jobs associated with the same stream or flow are processed in sequence and to enforce fairness in selection between different flows. Eligibility and priority can be continuously evaluated while waiting for space in the job queue, so that selection takes into account the latest conditions of the data processor.

In some embodiments, an ordering method first determines a job's eligibility for transfer to the job queue staging area (e.g., prefetch unit 158) and then assigns a priority for selection of the job. A job is eligible for transfer if the job is the first job in a flow or stream or the preceding job in the flow is already being executed or is complete. For jobs that share commands and context, jobs can start execution in order.

Only one job from each flow may be allowed in the staging area because only the next job is needed to get the benefits of sharing. Accordingly, in some embodiments, only the next job from a given flow can be made eligible for transfer into the staging area. This behavior preserves space within the staging area for jobs from more flows, which improves the chances of sharing for more flows.

Once a job is eligible for transfer into the staging area, the job is assigned a selection priority, depending on the job's opportunities to share commands and context with a job from the same flow that is currently being executed. The sharing opportunity with a particular job ends when that job is done executing. The system 100 (FIG. 1) attempts to exploit sharing between jobs that were part of the same dequeue response. Sharing is possible between jobs from the same flow and different dequeue responses, but a lower priority is used in that case. Although sharing between jobs from different dequeue responses will help improve performance for that flow, sharing between jobs from different dequeue responses is not given precedence over sharing between jobs from the same dequeue response of other flows. This approach provides fairness across multiple flows by providing a performance boost to all flows.

Once priorities are assigned, the list of jobs waiting for transfer to the job queue can be traversed in dequeue-order to find the oldest job with the highest priority. That job can then be transferred to the job queue staging area.

Figure 3:
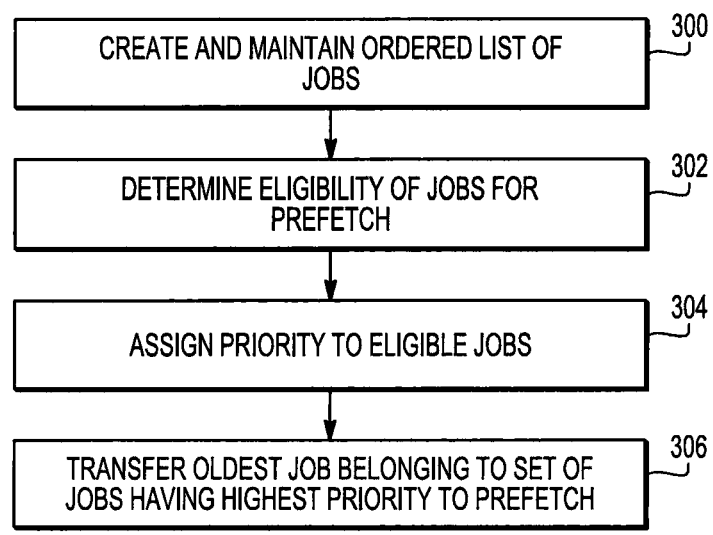
FIG. 3 is a flow chart illustrating the steps of an embodiment of a method for ordering job selection for efficient processing that can be implemented in the processing system of FIG. 1.

FIG. 3 is a flow chart illustrating the steps of an embodiment of a method for ordering job selection for efficient processing. In step 300, an ordered list of jobs is created and maintained based upon the results of a dequeue command. By maintaining the ordered list of jobs, the present system can ensure that jobs from the same flow start execution in order. In step 302, after the ordered list is created, the eligibility of certain jobs for transfer to a prefetch unit is determined. A number of criteria, as described below, may be used in determining the eligibility of a job for transfer. After a number of eligible jobs have been identified, in step 304 a selection priority is assigned to each eligible job. The priority of a particular job can be assigned based upon the rules described below. Finally, in step 306, with priorities assigned, the oldest job in the group of jobs having the highest assigned priority is transferred to the prefetch unit. From there, prefetch for the job (if necessary) will be completed and the job can be processed. Due to the prioritization of jobs, the probability that the commands and context for executing the job will already have been fetched is increased, resulting in fewer prefetch activities being required for execution of that job. Priorities, as described below, can be assigned to ensure that new packets are not able to 'lock-out' the older packets, preventing them from being executed.

In some embodiments, the methods include assigning priorities to different jobs according to the following rules. In the rules, priority 1 is the highest priority.

1. Priority level 1 is assigned to a job belonging to a particular flow if the job is not the first job of a dequeue response and another job (i.e., the preceding job) from the same flow is executing. In that case, there is an opportunity for sharing of commands and context that will be lost after the executing job finishes because registers containing commands and context will be cleared at that time.

2. Priority level 2 is assigned to a job belonging to a particular flow if the job is the first job of a dequeue response and another job (i.e., the preceding job) from the same flow is executing or if the job is the oldest in dequeue order. The oldest eligible job is assigned priority 2 rather than priority 3 even if the job has no opportunity for sharing to prevent the job from getting stalled indefinitely behind newer jobs with sharing opportunities.

3. Priority level 3 is assigned to a job if the job has no opportunity for sharing commands and context with an executing job.

Additional priority levels can be added, as needed, when more selection criteria are considered.

Figure 4A:
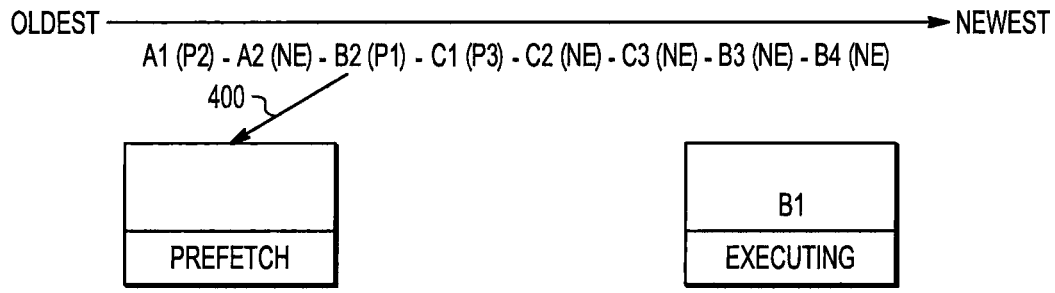
FIGS. 4A-4D are illustrations showing a first example implementation of the method for ordering job selection for efficient processing of FIG. 3.

In another embodiment, a method for assigning priorities to incoming jobs can be described with reference to FIGS. 4A-D. FIG. 4A shows an ordered list of jobs resulting from a dequeue command issued by an appropriate entity (e.g., a packet selector). The jobs are associated with one of three flows A, B, and C and are listed from oldest to newest. In FIG. 4A, the jobs include, in order, 2 jobs from flow A, 1 job from flow B, 3 jobs from flow C, and 2 more jobs from flow B.

The jobs are ordered, so that a job A1 is to be executed before a job A2 and a job A2 is to be executed before job A3, and so on. Jobs from the same flow (e.g., jobs A1, A2, and A3) can be executed while reusing the same commands and context (or at least a portion thereof). Jobs from different flows (e.g., A1, B1, and C1) require different commands and context for execution that must be loaded as part of a prefetch operation. In FIG. 4A, beside each job, in parenthesis, the priority allocation for that job is listed. Priorities vary from the highest priority P1 through P2, P3, and not eligible (NE) and are allocated according to the rules provided above.

Referring to FIG. 4A, at the time the depicted job list was retrieved (e.g., via a dequeue command), job B1 is currently being executed (e.g., by one of processors 162 of FIG. 2).

Given a list of candidate jobs, the present method determines which jobs are eligible for execution. As shown in FIG. 4A, packets A2, C2, C3, B3, and B4 are not eligible for transfer and have a corresponding priority of NE. They are not eligible because jobs from the same flows having lower sequence numbers already exist either in the ordered list of jobs, or in the prefetch unit. If a job with a lower sequence number is already present in the prefetch unit, there are no benefits to prefetching another job from the same stream—all the work to retrieve commands and context for the first job would be duplicated by the prefetch activities for the second job. Additionally, if each job is of a type that can modify the commands or context, prefetching the material for the second job before the first job completes could result in incorrect operation. With respect to packet A2, a lower numbered packet A1 already exists in the ordered job list. With respect to packet C2, a lower numbered packet C1 already exists in the ordered list of jobs. With respect to packet C3, lower numbered packets C1 and C2 already exist within the ordered job list. With respect to packet B3, a lower numbered packet B2 already exists in the ordered job list. With respect to packet B4, lower numbered packets B2 and B3 exist in the ordered job list.

Having determined which jobs are eligible for transfer to the prefetch unit (e.g., prefetch unit 158 of FIG. 2), priorities are assigned to each job according to the rules described above. Job A1 is assigned a priority of P2 because job A1 belongs to a different flow than the one currently being executed (flow B). Normally, job A1 would receive a priority of P3 as there is no efficiency in executing job A1 because commands and context for the A flow have not been retrieved. However, pursuant to rule 2, above, because A1 is the oldest job in the ordered list of jobs, A1 receives a priority of P2. This priority for A1 ensures that A1 will eventually be executed and will not be blocked out by newer jobs associated with other flows.

Job B2 receives the highest priority pursuant to rule 1, above, because there is an opportunity for sharing commands and context because the previous job from the B flow (job B1) is currently executing. This means commands and context for the B flow have already been loaded and there can be great efficiencies realized by executing other jobs from the B flow. As a result, it would be efficient to execute the B2 job next making the reloading of commands and context unlikely. Job C1 receives a priority of P3 pursuant to rule 3, above, as there is no opportunity for sharing commands and context for executing jobs for the C flow.

Accordingly, given the job listing in FIG. 4A the packet selector transfers job B2 into the prefetch unit for later processing as indicated by arrow 400.

Figure 4B:
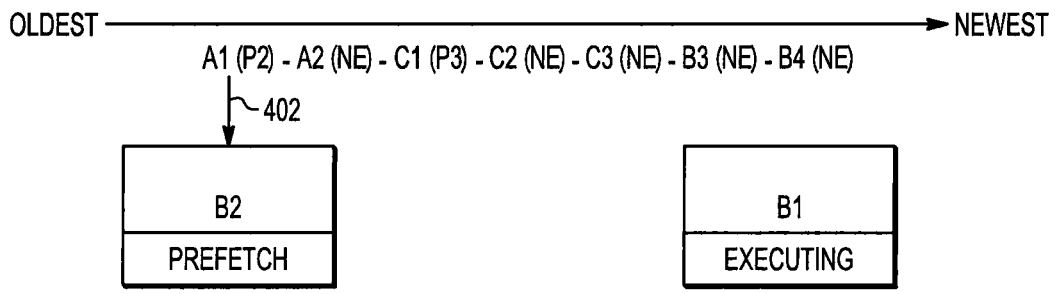

FIG. 4B shows the ordered job list status after job B2 is transferred into the prefetch unit. Here, the prefetch activities for job B2 can be very efficient as the commands and context for processing the B flow have already been retrieved as a result of job B1 having just been processed. The priorities of the remaining jobs are unchanged. Jobs B3 and B4 are both ineligible because a B job (B2) is already occupying the prefetch unit.

Given the priorities shown in FIG. 4B, therefore, job A1 is transferred into prefetch next, as indicated by arrow 402, as job A1 has the highest priority of available jobs.

Figure 4C:
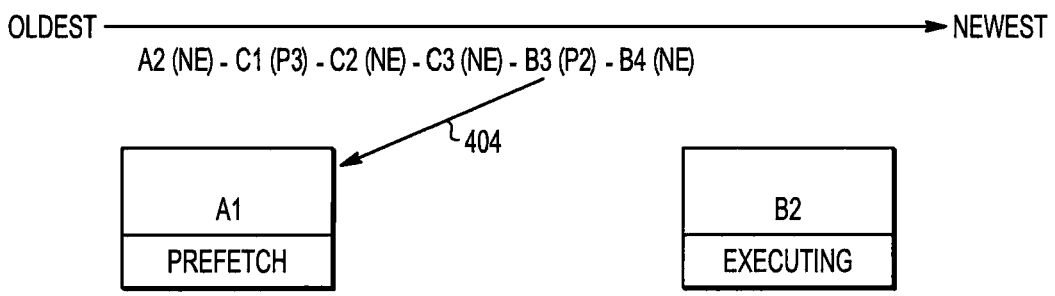

FIG. 4C shows the ordered job list status after job A1 is transferred into the prefetch unit. Here, job A1 is in prefetch and job B2 is executing. Jobs A2, C2, C3, and B4 are ineligible for transfer into prefetch. Job A2 is ineligible because a lower numbered job A1 is already in prefetch. Jobs C2 and C3 are ineligible because a lower numbered job C1 is already present in the ordered job list. Job B4 is ineligible because a lower numbered job B3 is present in the ordered job list. In this condition, job B3 has the highest priority and is transferred to the prefetch unit, as indicated by arrow 404.

Figure 4D:
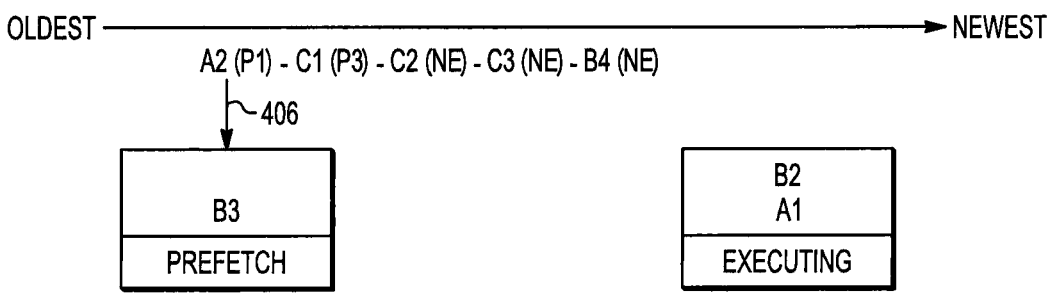

FIG. 4D shows the ordered job list status after job B3 is transferred into the prefetch unit. Here, job B3 is in prefetch and jobs B2 and A1 are executing. Note that although the example shown in FIG. 4A-4D presumes the capability to execute multiple jobs simultaneously (e.g., using multiple processors within a data processor such as a security processor), in some embodiments, the present method is equally applicable to a data processor having a single processor in which only a single job can be executing at a particular time.

Again, the prefetch activities for job B3 may be very efficient as the commands and context for processing the B stream have already been retrieved as a result of job B2 being processed. Job A2 is now assigned the highest priority of P1 because the previous A job, A1, is currently executing and there is an opportunity for reuse of commands and context. Job C1 receives a priority of P3 as there is no opportunity for reuse of commands and context (no previous C job is executing). Jobs C2, and C3 are each ineligible because a lower numbered job C1 is present in the ordered jobs list. Job B4 is ineligible became it is blocked by job B3 that currently occupies the prefetch unit. Accordingly, with these priorities, job A2 is transferred into prefetch, as indicated by arrow 406.

The algorithm illustrated by FIGS. 4A-4D is the same regardless of the number of execution units, or processors present within a data processing system. When allocating a job, the algorithm considers only whether other jobs are in prefetch or currently being executed in determining a priority for a particular job. The number of execution units or processors does not affect the processing method. Accordingly, the algorithm is equally applicable to a processing system including a single execution unit or processor or many execution units or processors.

Figure 5A:
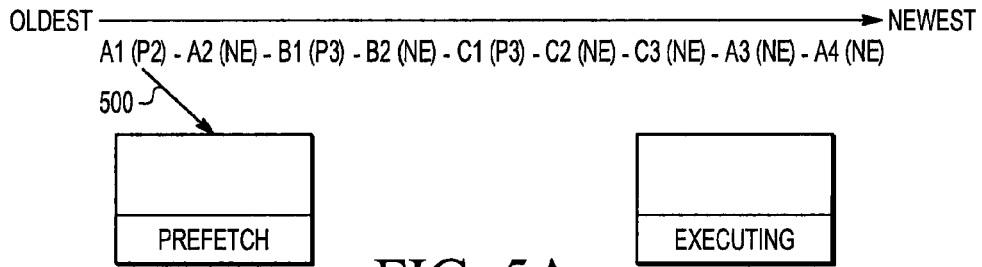
FIGS. 5A-5E are illustrations showing a second example implementation of the method for ordering job selection for efficient processing of FIG. 3.

FIGS. 5A-5E illustrate an embodiment of a method for optimizing job processing applied to another group of candidate jobs. The jobs are associated with one of three flows A, B, and C and are listed from oldest to newest. In FIG. 5A the jobs include 2 jobs from flow A, 2 jobs from flow B, 3 jobs from flow C, and 2 more jobs from flow A. The jobs are ordered, so that a job A1 is to be executed before a job A2. Jobs from the same flow (e.g., jobs A1, A2, and A3) can be executed while reusing the same commands and context (or at least a portion thereof). Jobs from different flows (e.g., A1, B1, and C1) require different commands and context for execution. Beside each job, in parenthesis, the priority allocation is listed for that job. Priorities vary from the highest priority P1 through P2, P3, and not eligible (NE).

After dequeuing the jobs shown in FIG. 5A, each job is analyzed to determine whether it is eligible for prefetching. Here, jobs A2, B2, C2, C3, A3 and A4 are each ineligible because they each have lower numbered jobs present within the ordered job list. The remaining jobs are each eligible for prefetch.

After identifying the eligible jobs, the eligible jobs are each allocated a priority. In FIG. 5A no jobs are executing. As a result, none of the jobs A1, B1, or C1 receives a priority of P1 (P1 priority is limited to jobs for which a job from the same flow from the same dequeue is currently executing). As a result, jobs B1 and C1 receive priorities of P3. A1 would be assigned a priority of P3, but being the oldest job in the ordered job list, job A1 receives a priority P2 pursuant to rule 2, above.

Accordingly, A1 having the highest priority, is selected for prefetch, as indicated by arrow 500.

Figure 5B:
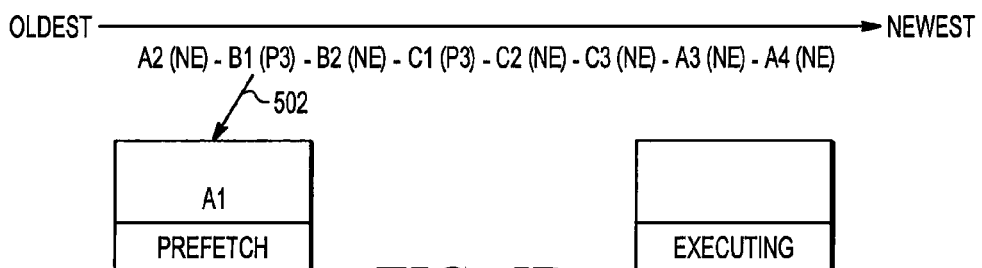

FIG. 5B shows the ordered job list status after job A1 is transferred into the prefetch unit. Here, job A2 is now ineligible for transfer because job A2 is blocked by the presence of job A2 in the prefetch unit. The remaining priorities are unchanged.

Accordingly, B1 is selected for prefetch because, of the jobs having a priority of P3 (the highest available priority), job B1 is the oldest. B1 is thus transferred to prefetch as indicated by arrow 502.

Figure 5C:
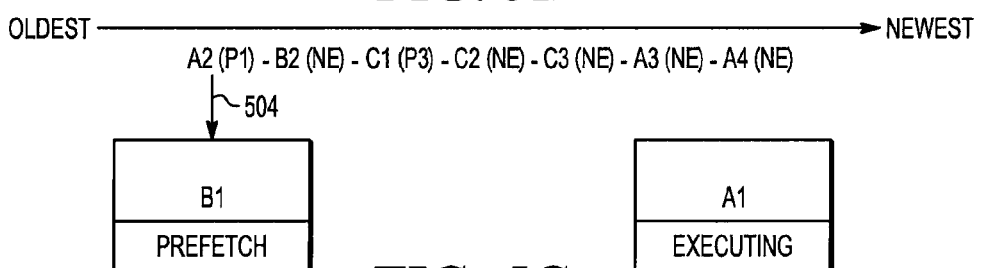

FIG. 5C shows the ordered job list status after job B1 is transferred into the prefetch unit and job A1 has begun executing. Here, job A2 receives a priority of P1 as the job preceding job A2 (i.e., job A1) is currently executing. Job B2 is now ineligible as its preceding job (i.e., B1) is occupying the prefetch unit. The priorities of the remaining jobs are unchanged.

Accordingly, job A2 is selected for prefetch as it has the highest priority, as indicated by arrow 504.

Figure 5D:
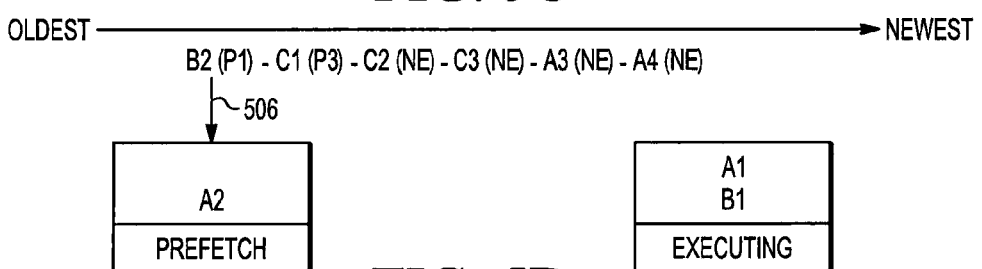

FIG. 5D shows the ordered job list status after job A2 is transferred into the prefetch unit and jobs A1 and B1 are executing. Here, job B2 receives a priority of P1 as its preceding job (B1) is currently executing and there are no jobs associated with the B flow in prefetch. Job A3 is ineligible because its preceding job A2 is occupying prefetch. The priorities of the remaining jobs are unchanged.

Accordingly, job B2 is selected for prefetch as it has the highest priority, as indicated by arrow 506.

Figure 5E:
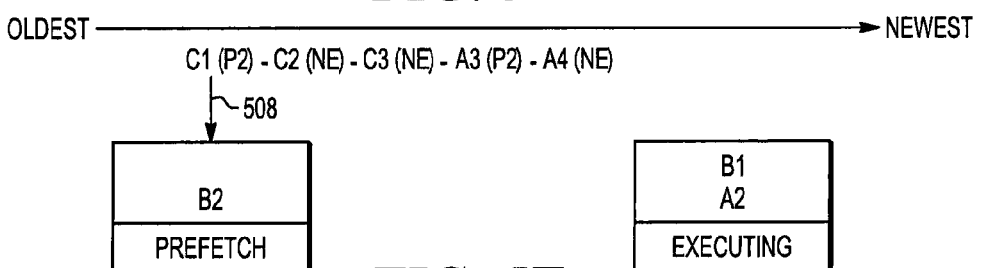

FIG. 5E shows the ordered job list status after job B2 is transferred into the prefetch unit, jobs B1 and A2 are executing, and job A1 has completed. Here, job C1 receives a priority of P2 because, although no prior C flow jobs are executing (which would ordinarily result in a priority of P3), job C1 is the oldest job in the ordered job list. Job A3 receives a priority of P2 because job A3 is the first job of a dequeue response. The priorities of the remaining jobs are unchanged.

Accordingly, job C1 is selected for prefetch as it is the oldest of the jobs having a priority of P2, as indicated by arrow 508, demonstrating that the present method prevents older jobs from becoming stuck, as described above.

In some embodiments, methods for ordering job flow through a security processor or other data processing unit allows for increased efficiency by increasing the reuse of commands and context used to process incoming packets. In one experiment, the present system and method was found to increase data throughput and resource utilization by 4% in a simulation of 30 IPSEC streams having 15 packets and 20% in particular customer use cases. The method can be used in a data processor having any number of processors or execution units. Furthermore, the method can be applied in a data processor having a prefetch unit configured to simultaneously prefetch any number of jobs.

Some data processing units, such as security processors 150 (FIG. 2), include a limited number of shared resources (sometimes referred to as critical resources) used in the processing of incoming packets or jobs. Shared resources include, for example, hardware accelerators, cryptographic engines (e.g., specialized processing engines for executing different encryption functions using different encryption standards such as DES, AES, or RC4), and the like). The shared resources are shared amongst available processors or execution units within the security processor. In some security processors there may be fewer shared resources than the number of available processors 162 (FIG. 2) or execution units.

Figure 6:
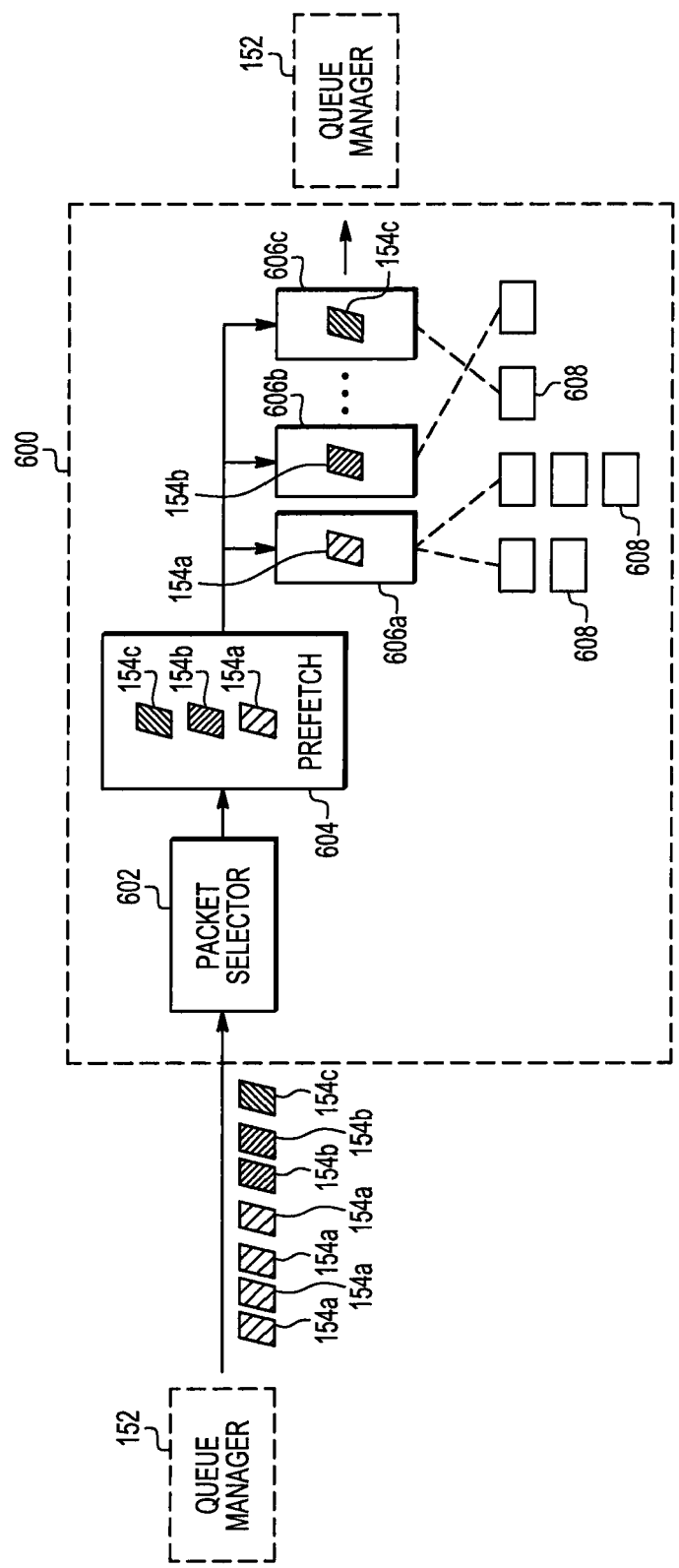
FIG. 6 is a block diagram showing the functional blocks of an embodiment of a data processor that may be implemented in conjunction with the processing system of FIG. 1, where the data processor includes a number of shared resources.

FIG. 6 is a block diagram showing the functional blocks of an embodiment of a data processor that may be implemented in the processing system 102 of system 100 (FIG. 1) that includes a number of shared resources. In the present example, the data processor includes security processor 600, though other types of data processors may be utilized in conjunction with embodiments of the present method. Security processor 600 may be implemented as an independent processing device that is separate from processor 102 of system 100. Alternatively, security processor 600 may be implemented as a software module that is executed by processor 102. The security processor 600 shown in FIG. 6 receives task assignments from processor 102 of system 100 in the form of a number of input packets or frames.

Security processor 600 receives input packets for processing from processor 102 of system 100 (see FIG. 1) via queue manager 152. To retrieve data for processing, security processor 600 retrieves packets from queue manager 152 using a dequeue request. With each dequeue request, queue manager 152 delivers a number of packets 154 to security processor 600 for processing.

Each packet 154 is associated with a particular communication stream. For example, in FIG. 6, packets 154*a* belong to the same communication stream, while packets 154*b* and 154*c* each belong to their own communication stream.

In FIG. 6, each packet 154 is associated with one or more shared resource of security processor 600 that is used to process packet 154. To associate a particular packet 154 with a particular shared resource, queue manager 152 provides metadata to security processor 600 that describes a relationship between each packet 154 and a particular shared resource.

After the dequeue command is transmitted to queue manager 152 and queue manager 152 transmits a number of dequeued packets 154 to security processor 600, the dequeued packets (or references thereto) are received and stored by packet selector 602 along with the metadata identifying the shared resources to be used in processing each packet. Packet selector 602 is a functional module of security processor 600 configured to determine the order in which packets 154 received from queue manager 152 are to be processed.

When packet selector 602 determines that a particular incoming packet is to be processed, packet selector 602 transfers the packet (or reference data identifying the packet) to prefetch unit 604. Prefetch unit 604, after receiving the packet from packet selector 602, retrieves the commands and context 160 associated with the processing of that packet. The prefetch unit 604 may also retrieve the data that is to be processed in association with the packet 154.

After the prefetch unit 604 has retrieved both the commands and context as well as packet data for the packet, the prefetch unit 604 transfers the packet and associated data to one of processors 606 of security processor 600 for processing.

Security processor 600 may include one or more processors 606 configured to process data associated with the packets of one or more input communication streams. In processing the incoming packets, processors 606 may rely upon one or more shared resources 608. Shared resources 608 may include hardware accelerators, cryptographic engines, and the like that are utilized by processors 606 in the processing of an input packet. Generally, when one of the processors 606 within the security processor 600 is using a shared resource, that resource becomes unavailable to the other processors in the security processor.

After the packet data is processed, security processor 600 outputs the processed data to queue manager 152 using an enqueue process (in FIG. 6, the same queue manager 152 is illustrated at both the input and output of processor 150). The processed data can then be used by system 100. As security processor 600 completes the processing of incoming packets 154, additional packets are dequeued from queue manager 152 to ensure that security processor 600 has a continual flow of incoming packets for processing.

Because there are a limited number of shared resources within security processor 600, if too many packets or jobs are assigned to the processors 606 of the security processor that each use the same shared resources, those jobs will be stalled until the shared resources become available.

Accordingly, in some embodiments, a job ordering method attempts to select jobs from a list of candidates so that no shared resource of the security processor 600 is over-subscribed. The job ordering method can be implemented in a front-end to the parallel processing system (e.g., at packet selector 602). When implemented by a packet selector, the packet selector transfers jobs to a job queue that buffers and prepares jobs to start execution. The packet selector knows the number of each shared resource available and maintains a usage counter for each shared resource.

When selecting jobs for execution, the packet selector selects jobs to improve the likelihood that shared resources are available for the job upon execution. The packet selector may also consider whether job candidates are part of the same flow as jobs already executing. In that case, resource setup for the next job can often be reduced, leading to performance improvements, as described in detail above.

When selecting jobs to improve the likelihood that shared resources are available for job execution, in some embodiments, a number of rules can be implemented, as described below with reference to FIG. 7. To manage the application of the rules, usage counters can be maintained for each different type of shared resource to reflect how many of those shared resources are being utilized in conjunction with a currently executing job. It can be assumed that jobs from the same flow execute serially because of ordering requirements and to allow sharing of commands and context, which is typical for communications and cryptographic processing.

Figure 7:
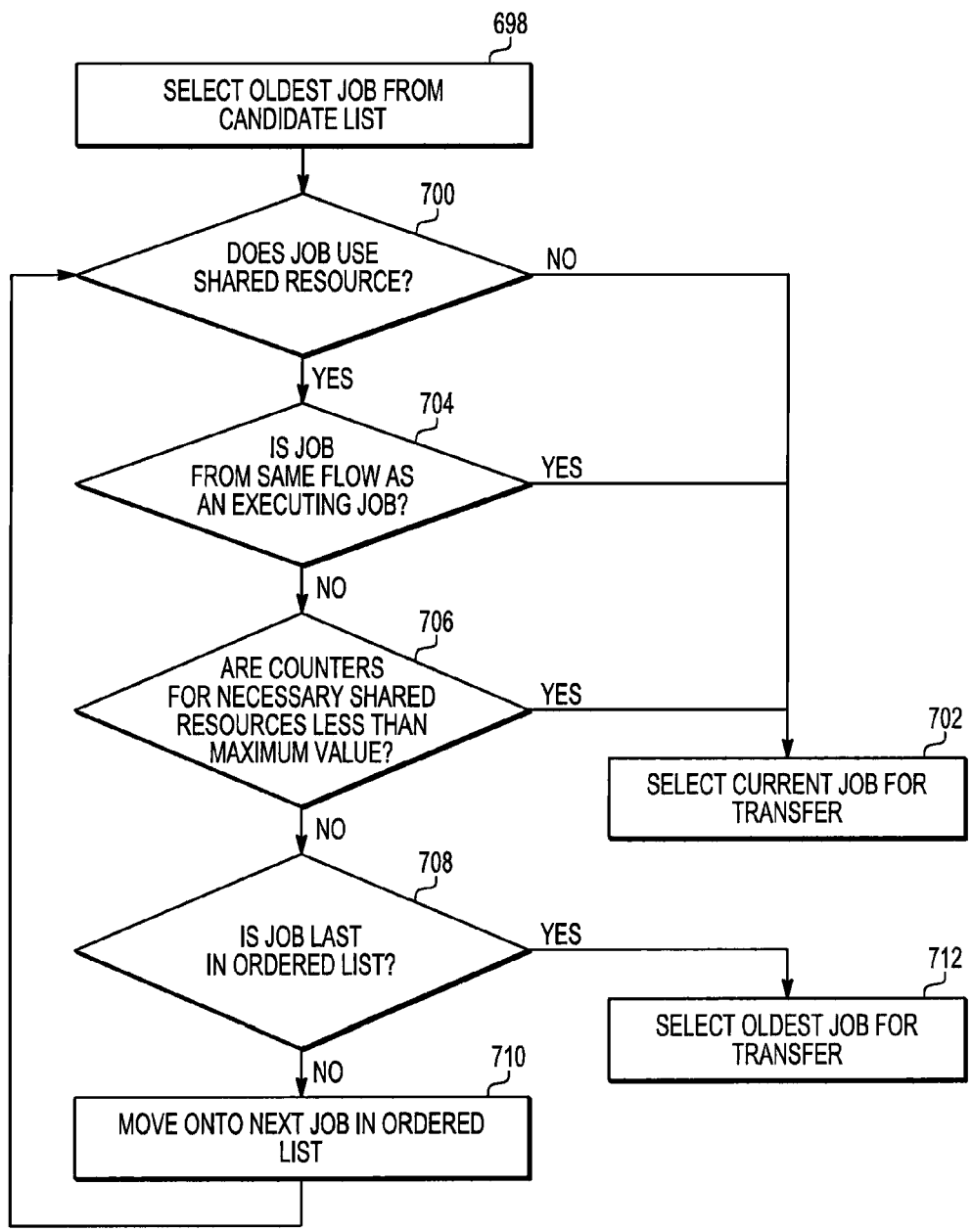
FIG. 7 is a flow chart illustrating an embodiment of a method for a packet selector to select jobs in an order to minimize the likelihood of contention in accessing shared resources that can be implemented in the processing system of FIG. 6.

Given a particular set of candidate jobs, FIG. 7 is a flow chart illustrating an embodiment of a method for a packet selector to analyze a list of candidate jobs and select jobs from that list in an order to minimize the likelihood of contention in accessing shared resources of the security processor 600 of FIG. 6. The method presumes that it is possible to identify shared resources that are used to complete processing of a particular job (for example, queue manager 152 of FIG. 6, for each packet 154 transmitted to packet selector 602, could provide information identifying any necessary shared resources). The method shown in FIG. 7 allows a packet selector to analyze a collection of candidate jobs to determine whether any of those jobs that are suitable for prefetch (and, ultimately, processing) will result in contention for shared resources. Alternatively, the method shown in FIG. 7 can be used as a stand-alone method to select jobs for transfer to execution.

In step 698, a first job from the candidate list is selected for analysis. In one embodiment, the first selected job is the oldest job in the candidate list. In other embodiments, though, different criteria may be used for selecting the first job from the candidate list (e.g., the newest job, the oldest job from a preferred stream, the oldest job that does not require any shared resources, the oldest job that requires the highest number of shared resources, or the oldest job that requires particular shared resources).

In step 700, a job from the ordered list of candidate jobs is analyzed to determine whether the job requires the use of a shared resource. If not, that job may be selected for transfer to a prefetch unit 602 for processing in step 702. The selection can occur without further investigation into the availability of shared resources as processing of the job will not result in contention for shared resources. Alternatively, when the method of FIG. 7 operates to determine an eligibility of a particular job for transfer, step 702 may instead designate a particular job as being eligible for transfer rather than cause the transfer of that job. In that case, different priority schemes can be used to select which of the jobs designated as eligible for transfer are selected for transfer. In some cases, additional eligibility tests are also applied to the job.

If the job does require a shared resource, in step 704 the job is analyzed to determine whether the job belongs to the same flow as a job that is already executing. If so, any shared resources that are required by the job being analyzed will be freed up when the execution of the previous job that belongs to the same flow completes. When the executing job finishes, the shared resource will be retained for use by the next job in that flow (assuming it has been transferred to the job queue by that time). Accordingly, the job may be selected for transfer to a prefetch unit for processing in step 702.

If the job does not belong to a flow for which a job is already executing, in step 706 the job is analyzed to determine whether the usage counters for shared resources required by the job are less than their maximum values. If so, needed shared resources are available and the job may be selected for transfer to a prefetch unit for processing in step 702. If the job is selected for transfer and execution, the appropriate shared resource counters are incremented.

If one or more of the counters for the required shared resources are at their maximum value, necessary shared resources are not available for the job. Accordingly, in step 708 the method determines whether the job being analyzed is the last of the available candidate jobs. If not, other candidate jobs may satisfy the requirements of steps 700, or 704, or 706 and be eligible for selection in step 702. Accordingly, in that case, the method returns to step 700 to analyze another job in the listing of candidate jobs.

If the job being analyzed is the last job in the listing of candidate jobs, it can be determined that no job in the listing of candidate jobs satisfies the requirements of steps 700, 704, or 706 and is eligible for selection via step 702. In that case, in the embodiment shown in FIG. 7, the oldest job in the set of candidate jobs is selected for transfer in step 712. Alternatively, if no jobs satisfy the requirements of steps 700, 704, or 706, other actions may be undertaken. For example, if no jobs satisfy the requirements of steps 700, 704, or 706 the selection of a job for transfer could be deferred until a job satisfies the requirements of steps 700, 704, or 706 and is eligible for selection in step 702 (e.g., until a required shared resources becomes available). In that case, the method of FIG. 7 may be re-executed. Alternatively, other selection criteria may be used to select a job for transfer from the candidate job list when no jobs in the candidate jobs list satisfies the requirements of steps 700, 704, or 706 (e.g., the selected job could be the newest job, the oldest job from a preferred stream, the oldest job that does not require any shared resources, the oldest job that requires the highest number of shared resources, or the oldest job that requires particular shared resources in the candidate job list).

In an embodiment where a selection is made when no job satisfies the requirements of steps 700, 704, or 706, a resource may become over-subscribed, that only occurs when no better options exist. Jobs transferred to the job queue based on step 708 will probably become stalled waiting for release of the resource. Even so, there are at least two reasons to transfer those jobs into prefetch. First, the job queue can still prepare that job for execution when the resource becomes available. Second, transferring that job to the job queue may allow more jobs to be added to the ordered job list (via a dequeue operation). Those additional jobs may use different resources and may be better candidates for selection when the next job is transferred.

Using this method, the eligibility of jobs for selection is continuously re-evaluated so that the current status of all jobs is taken into account. When a job using a shared resource finishes executing, if there are no jobs from the same flow in the job queue ready to start execution, the shared resource usage counters for shared resources used by that job are decremented.

In one implementation, the method illustrated in FIG. 7 is implemented in conjunction with the eligibility and prioritization scheme illustrated in FIG. 3 described above. In such an arrangement, following the determination of eligibility in step 302 of FIG. 3, an availability of shared resources is used to modify the priority assigned to jobs in step 304. For example, jobs that do not satisfy the shared resource requirements of step 700, 704, and 706 of FIG. 7 may be assigned a new lower priority (e.g., a priority of level 4, below priority levels 1, 2, and 3 described above). Alternatively, in another embodiment, jobs that do not satisfy the shared resource requirements of steps 700, 704, and 706 of FIG. 7 are automatically designated as not eligible for processing and will not be allocated a priority. If an eligible job satisfies one or more of the requirements of steps 700, 704, and 706 of FIG. 7, the job can then be assigned priority level 1, 2, or 3, pursuant to an appropriate prioritization scheme. Accordingly, the shared resource requirements can operate as a prioritization factor and can be implemented as part of step 304 of FIG. 3, for example. If no jobs satisfy the shared resources requirements, one of the jobs may be selected anyway if the eligibility criteria of step 302 are met.

Figure 8:
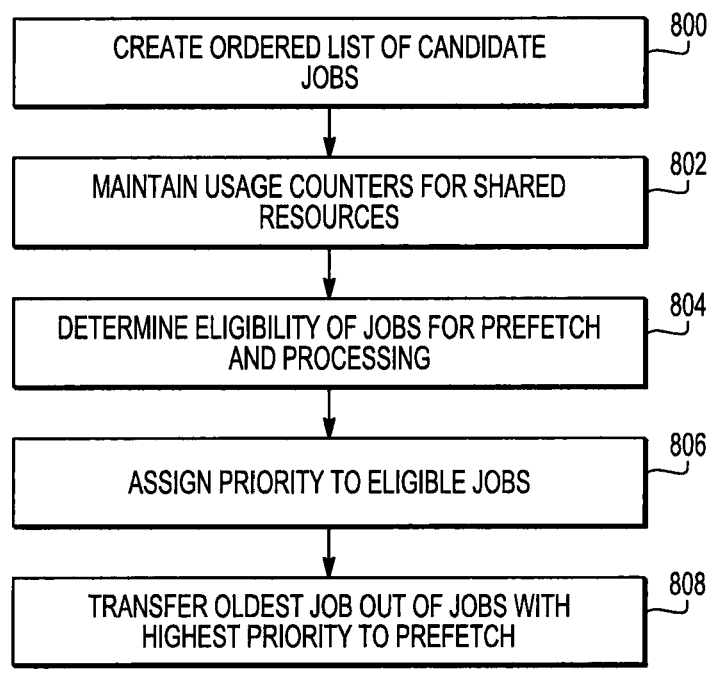
FIG. 8 is a flowchart showing an embodiment of a method for processing jobs that combines the methods of FIG. 3 and FIG. 7.

To further illustrate, FIG. 8 is a flowchart showing a method for processing jobs that combines elements of the methods of FIG. 3 and FIG. 7. The method may be executed, for example, by a data processor such as a security processor 150, 600, described above. In step 800, an ordered list of candidate jobs is created based upon the results of a dequeue command. The ordered list may include a number of attributes of each job, including an identification of any shared resources required for processing of the job, as well as an identification of commands and context and data that must be in place before execution of the job may take place. By maintaining the ordered list of jobs, embodiments of the present system can ensure that jobs from the same flow start execution in order.

In step 802, usage counters for each available shared resource are maintained. As such, as jobs using particular shared resources undergo execution, the counters for those shared resources are incremented. When a job using shared resources finishes execution, unless the next job being executed is from the same flow (indicating that the same shared resources will be used), the counters for those shared resources are decremented. The counters each have a maximum value indicative of the number of each type of shared resource available. In the method, steps 800 and 802 may be executed in any order—they are both ongoing activities that may be constantly updated while the method of FIG. 8 is executed.

In step 804, the eligibility of jobs for prefetch and processing takes place. This determination may involve determining whether necessary shared resources are available for use in processing the job (for example, by executing the method shown in FIG. 7), determining whether other jobs from the same flow are currently occupying prefetch, thereby blocking the execution of a particular job, as described above, or determining whether preceding jobs are already present in the ordered list of jobs.

Once a number of eligible jobs has been identified, in step 806 a priority is assigned to each of the eligible jobs, as described above. Once the priorities have been assigned, in step 808 the oldest job of jobs having the highest priority is transferred to the prefetch unit. From there, prefetch for the job (if necessary) will be completed and the job can be processed. Upon execution of a particular job, the method shown in FIG. 8 increases the likelihood that necessary shared resources will be available during processing. Additionally, due to the prioritization of jobs, the probability that the commands and context for executing the job will already have been fetched is increased, resulting in fewer prefetch activities being required for execution of that job.

Embodiments of systems and methods disclosed herein, therefore, can increase the efficiency of a processing system configured to process incoming data packets of jobs associated with a number of communication streams or flows. The priorities amongst a number of candidate input jobs can be allocated to minimize the likelihood that commands and context for a particular job will have to be reloaded upon execution of the job. Additionally, embodiments of the present systems and methods can improve the likelihood that, upon executing a particular job, shared resources that are necessary for the execution of the job will be available. These improvements minimize the occurrences of bottlenecks within the data processing system, thereby improving throughput.

Although the present disclosure describes specific examples, embodiments, and the like, various modifications and changes can be made without departing from the scope of the present disclosure as set forth in the claims below. For example, although the exemplary methods, devices, and systems described herein are in conjunction with a configuration for the aforementioned data processors, the skilled artisan will readily recognize that the exemplary methods, devices, and systems may be used in other methods, devices, and systems and may be configured to correspond to such other exemplary methods, devices, and systems as needed. Further, while at least one embodiment has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

What is claimed is:

1. A method of processing a job with a data processor, the method comprising:
   determining, by a packet selector, a candidate job list including an ordered listing of candidate jobs, each candidate job in the ordered listing belonging to a communication stream;
   identifying jobs in the candidate job list that are ineligible for transfer to a prefetch unit of the data processor, the prefetch unit being configured to prepare jobs for execution, by:
      for each candidate job in the candidate job list, when a preceding job belonging to the same communication stream as the candidate job is present in the candidate job list, designating the candidate job as ineligible,
      for each candidate job in the candidate job list, when a preceding job belonging to the same communication stream as the candidate job is being prepared for execution, designating the candidate job as ineligible, and
      designating the remaining jobs in the candidate job list as eligible for transfer to the prefetch unit;
   determining, by the packet selector, a priority for each eligible candidate job in the candidate job list by at least comparing the communication stream of each candidate job to a communication stream of a first job being executed by the data processor;
   selecting, by the packet selector, an oldest job of the ordered listing of candidate jobs having a highest priority for transfer to the prefetch; and
   after transferring the selected job to the prefetch unit, executing, by a processing unit, the selected job.

2. The method of claim 1, wherein executing the selected job includes using ancillary data retrieved during the execution of the first job.

3. The method of claim 2, wherein the ancillary data includes commands and context for executing the selected job.

4. The method of claim 2, wherein the ancillary data includes an encryption key.

5. The method of claim 1, wherein the data processor includes a security processor.

6. A system of processing a job with a data processor, the system comprising:
   a processing unit;
   a memory coupled to the a processing unit; and
   a packet selector executed by the processing unit to:
      determine a candidate job list including an ordered listing of candidate jobs, each candidate job in the ordered listing belonging to a communication stream, identify jobs in the candidate job list that are ineligible for transfer to a prefetch unit of the data processor, the prefetch unit prepares jobs for execution, by:
    for each candidate job in the candidate job list, when a preceding job belonging to the same communication stream as the candidate job is present in the candidate job list, designating the candidate job as ineligible,
    for each candidate job in the candidate job list, when a preceding job belonging to the same communication stream as the candidate job is being prepared for execution, designating the candidate job as ineligible, and
    designating the remaining jobs in the candidate job list as eligible for transfer to the prefetch unit;
determine a priority for each eligible candidate job in the candidate job list by at least comparing the communication stream of each candidate job to a communication stream of a first job being executed by the data processor;
    select an oldest job of the ordered listing of candidate jobs having a highest priority for transfer to the prefetch; and
    after transferring the selected job to the prefetch unit, execute, by the processing unit, the selected job.

7. The system of claim 6, wherein the data processor executes the selected job using ancillary data retrieved during the execution of the first job.

8. The system of claim 7, wherein the ancillary data includes commands and context for executing the selected job.

9. The system of claim 7, wherein the ancillary data includes an encryption key.

* * * * *